US006311551B1

(12) United States Patent
Boutaghou

(10) Patent No.: US 6,311,551 B1
(45) Date of Patent: Nov. 6, 2001

(54) METHOD FOR DETERMINING CHARACTERISTICS OF AN ASPERITY BASED UPON DETECTION MEMBERS HAVING A UNIQUE VIBRATION FREQUENCY

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/310,076

(22) Filed: May 10, 1999

Related U.S. Application Data

(62) Division of application No. 08/844,836, filed on Apr. 22, 1997, now Pat. No. 5,942,680.

(51) Int. Cl.[7] .................................................... G01R 1/00
(52) U.S. Cl. ........................................................ 73/105
(58) Field of Search ..................... 73/104, 105, 12.01, 73/12.09

(56) References Cited

U.S. PATENT DOCUMENTS

| | | | |
|---|---|---|---|
| 4,674,875 | 6/1987 | Koizumi | 356/237 |
| 4,881,136 | 11/1989 | Shiraishi et al. | 360/25 |
| 4,931,338 | 6/1990 | Toffle | 428/65 |
| 5,063,712 | 11/1991 | Hamilton et al. | 51/67 |
| 5,410,439 | 4/1995 | Egbert et al. | 360/75 |
| 5,412,519 | 5/1995 | Buettner et al. | 360/73.03 |
| 5,423,111 | 6/1995 | Mori | 29/90.01 |
| 5,527,110 | 6/1996 | Abraham et al. | 374/5 |
| 5,528,922 | 6/1996 | Baumgart et al. | 73/1 |
| 5,808,184 | * 9/1998 | Boutaghou et al. | 73/105 |
| 5,942,680 | * 9/1998 | Boutaghou | 73/105 |

\* cited by examiner

Primary Examiner—Robert Raevis
(74) Attorney, Agent, or Firm—Westman, Champlin & Kelly, P.A.

(57) ABSTRACT

A sensor head for mapping asperities on a disc surface including a plurality of spaced members having unique excitation characteristics for distinguishing the members excited. The sensor head is designed to fly at pitch angle $\theta_P$ above a disc surface via cooperation of an air bearing surface of the sensor head and rotation of the disc to map the asperities on the disc surface. The members are located relative to the air bearing surface for alignment relative to the disc surface. The members fly above the disc surface with the head at various heights. Depending upon the height of an asperity, various members contact the asperity and are excited thereby. Excitation of the various members is detected based upon the unique excitation characteristics for determining the height of an asperity on the disc surface.

3 Claims, 3 Drawing Sheets

METHOD FOR DETERMINING CHARACTERISTICS OF AN ASPERITY BASED UPON DETECTION MEMBERS HAVING A UNIQUE VIBRATION FREQUENCY

REFERENCE TO CO-PENDING APPLICATIONS

This application is a Divisional application of application Ser. No. 08/844,836, filed Apr. 22, 1997, which issued Aug. 24, 1999 as U.S. Pat. No. 5,942,680.

Cross-reference is hereby made to U.S. application Ser. No. 08/831,070, filed Apr. 1, 1997, now U.S. Pat. No. 5,825,181 and entitled "Multi-Impact Thermal Asperity of Sensor Head" and U.S. application Ser. No. 08/855,325, filed on May 13, 1997, now U.S. Pat. No. 5,808,184 and entitled "Thermal Asperity Sensor Head with Multiple Spaced Asperity Sensors".

BACKGROUND OF THE INVENTION

The present invention relates to a disc drive storage system. More particularly, the present invention relates to a thermal asperity sensing head design which provides characteristic information for thermal asperity defects on a surface of a magnetic data storage disc. Disc drive data storage devices are known which read and write data from a thin layer of magnetizable material on a surface of one or more rotating discs. Read and write operations are performed through a transducer which is carried in a slider body. Slider and transducer are sometimes collectively referred to as a head. Each disc surface has a single head associated therewith to read and write data from the disc surface.

Heads are supported via an actuator assembly, which moves the heads for alignment relative to concentric data tracks on a disc surface. The actuator assembly is controlled by electronic circuitry coupled to the actuator assembly in a known manner. The head is designed to fly above the disc surface for operation via cooperation of the rotating discs and an air bearing surface on the slider. As the disc rotates, the disc drags air beneath the air bearing surface of the slider, which develops a lifting force, causing the head to lift and fly above the disc surface.

The entire disc surface of a magnetic disc is not ideal for reading and writing data. In particular, disc surfaces have asperities which interfere with the flying characteristics of the data head, as well as the read and write operations of the data head. In operation, the head can come into contact with asperities while the head flies above the surface of the disc. Potentially, this undesirable contact can cause data written to a particular location on a disc to be lost.

For example, in a magnetoresistive (MR) head which incorporates a MR type sensor, after contact with an asperity, the heat generated by the contact changes the resistive properties of the MR sensor. As a result, the corresponding signal read by the MR head is distorted by a voltage spike and subsequent decay, sometimes causing the data stored near the asperity to be unrecoverable. The voltage spike in the read signal is frequently referred to as a "thermal asperity", while the defect on the disc is referred to as an "asperity". However, since one is indicative of the other, the two terms are frequently used interchangeably.

Disc asperities which are located in the factory during a defect scanning process can be recorded in a disc drive's primary defect list so that the drive does not store data at those locations. Known asperity detection techniques use sensors (such as MR sensors or piezoelectric sensors). Such known asperity detection techniques rely both on the flying characteristics of the heads and upon the thermal response from friction induced head/asperity contact. The energy of the impact or amplitude detected by an MR or other sensor is calibrated to determine the asperity characteristics such as height of the asperity. By calibrating the slope and duration of the resistance change waveform to a range of asperity heights and characteristics, the height of a particular asperity can be determined by detecting the momentary change in resistance of the sensor after contact.

However, the voltage signals corresponding to the impact of a sensor element with an asperity include components of noise, air bearing excitation, and other vibrations or excitations which may detract from the accuracy of calibrating the height of an asperity based upon the voltage signal from an MR sensor element or a piezoelectric sensor element after contact with the asperity.

Additionally, such devices require that the disc surface be scanned at various fly heights of the head so that various sizes of asperities can be detected to map the entire range of defects. As the speed of rotation of the disc is changed, the response of the specially-designed heads also changes. For example, if the speed is reduced, the energy of impact is reduced, thus making it more difficult to calibrate the defect size and height.

SUMMARY OF THE INVENTION

The present invention relates to a sensor head for detecting and determining the characteristics of asperities on a disc surface. The sensor head includes a body having a leading edge, a trailing edge and an air bearing surface. A plurality of spaced members are located on the air bearing surface. Each of the members has a unique excitation characteristic. The members are arranged at various heights above the disc surface when the head is flying above the disc surface at a pitch angle $\theta_P$.

Asperities may extend above the disc surface at different heights. Certain members will contact the asperity depending upon whether the fly height of the member above the disc surface is lower than the height of the asperity. The unique excitation characteristics of the members are used to distinguish the members which contact the asperity. The fly height above the disc surface of the members contacted is used to calculate the height of the asperity.

DETAILED DESCRIPTION OF THE PREFERRED EMBODIMENTS

Figure 1:
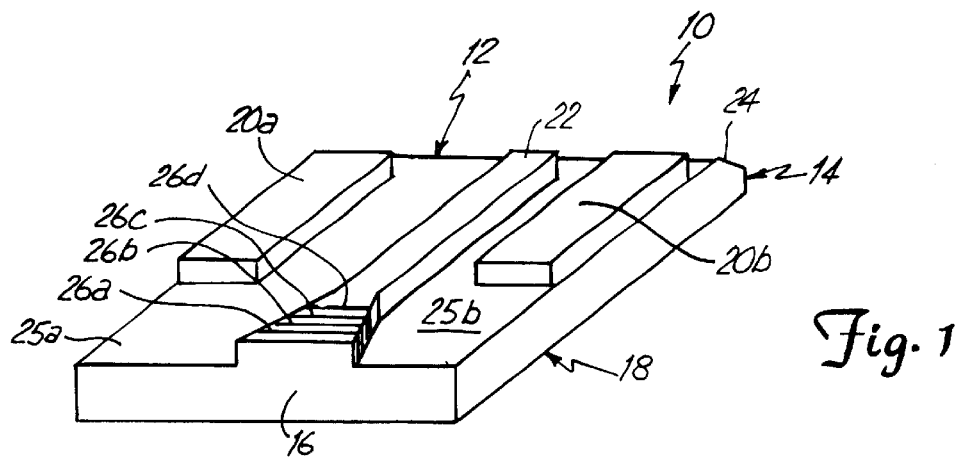
FIG. 1 is a perspective view of a sensor head of the present invention.

The present invention relates to a sensor and burnish head 10 shown in FIG. 1 which is supported to fly above a disc surface in a known manner for mapping disc defects. The sensor head 10 shown in FIG. 1 includes a lower air bearing surface 12, a leading edge 14, a trailing edge 16, and an upper surface 18. The sensor head 10 is supported relative to a disc surface via a suspension system (not shown) coupled to the upper surface 18. The sensor head 10 is supported via the upper surface 18 so that the lower air bearing surface 12 faces the disc surface to provide an air bearing for lifting the sensor head 10 to fly above the disc surface in cooperation with the rotation of the disc.

As shown in FIG. 1, the air bearing surface 12 includes the side rails 20a–b, a center rail 22 and sloped leading surface 24. Recessed pressure cavities 25a–b are defined between the side rails 20a–b and center rail 22. The side rails 20a–b and center rail 22 define high-pressure surfaces. Rotation of a disc provides a flow of air from the sloped leading surface 24 along the air bearing surface 12 for creating a hydrodynamic lifting force to lift the sensor head 10 to fly across the disc surface.

Center rail 22 includes a plurality of spaced frequency members 26a–d, positioned at a trailing end 16 of the center rail 22 for alignment with the disc surface as the sensor head 10 flies above the disc surface. Each frequency member 26a–d is designed to resonate at a unique and different frequency when excited. The frequency members 26a–d are designed for detecting and calculating the characteristics (height) of an asperity while the sensor head 10 is flying above a disc surface as will be described.

Figure 2:
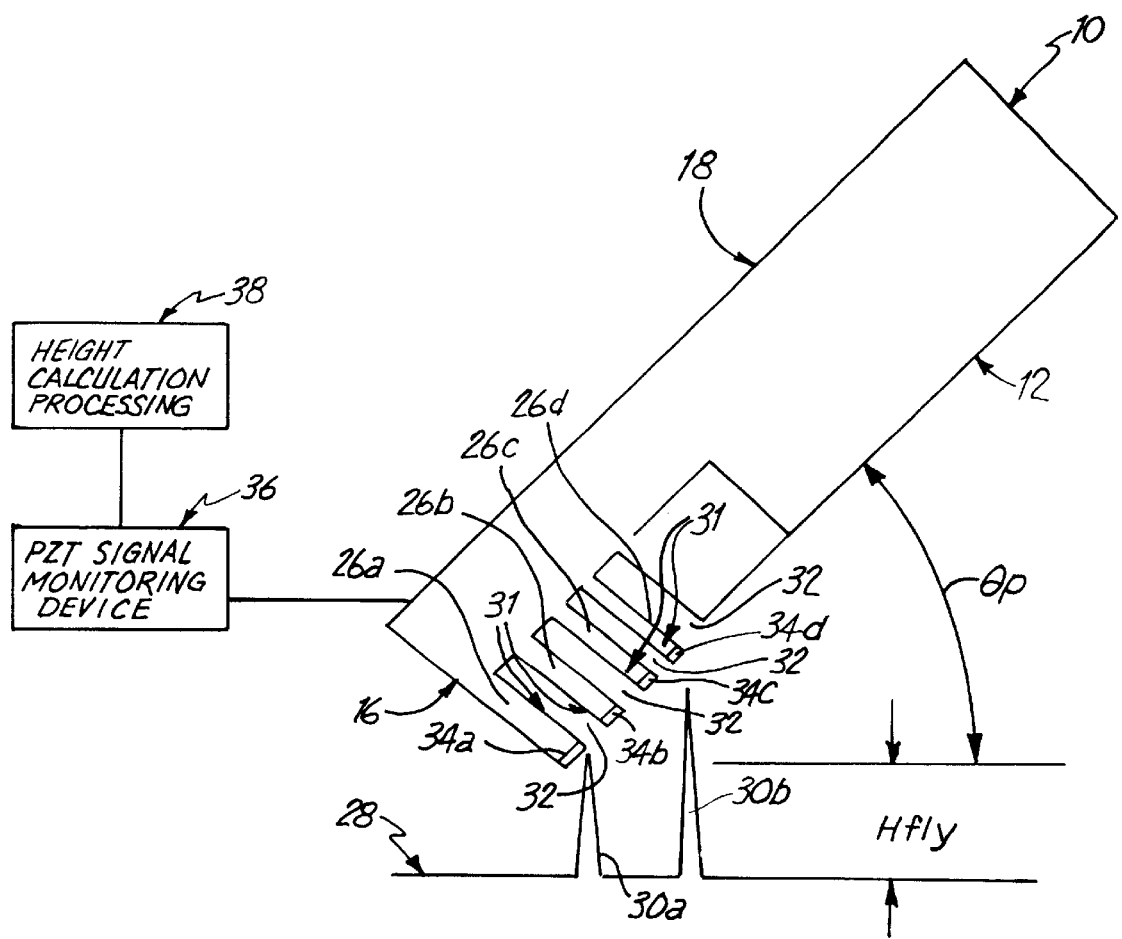
FIG. 2 is diagrammatic view of the sensor head and disc surface illustrating operation of the sensor head to detect asperities on the disc surface.

FIG. 2 is a side elevational view of the sensor head 10, greatly exaggerated, illustrating operation of frequency members 26a–d for ascertaining the characteristics of asperities on a disc surface 28. As shown, disc surface 28 includes asperities 30a and 30b. Asperity 30b is higher than asperity 30a. Sensor head 10 flies above the disc surface 28 at a pitch angle $\theta_P$ at a fly height of $H_{fly}$. If the height of the asperities 30a and 30b is greater than $H_{fly}$ of the sensor head 10, sensor head 10 will contact the asperities 30a and 30b.

Preferably, frequency members 26a–d are polygonal-shaped members having an end integrally formed with the slider 12 and a cantilevered end 31 to define a spring-like element. Frequency members 26a–d extend along a length of the air bearing surface 12 of the sensor head 10 separated by recessed cavities 32 to a portion of the air bearing surface 12. Preferably, form frequency member 26a is located adjacent to the trailing end 16 and members 26b–d extend along the air bearing surface 12 therefrom. During operation, the elevation of each of the frequency members 26a–d is different since the sensor head 10 flies at a pitch angle $\theta_P$. Thus, frequency member 26a is flying closer to disc surface 28 than frequency member 26d based upon the pitch angle $\theta_P$. Thus depending upon the height of the asperity, the asperity will contact one or more of the frequency members 26a–d based upon $\theta_P$ of the sensor head 10.

When the frequency members 26a–d contact an asperities, the impact of the contact will cause the frequency members 26a–d to vibrate. In particular, contact with an asperity will excite the cantilevered ends of the frequency members 26a–d causing the frequency members to vibrate. Each of the frequency members 26a–26d has unique dimensions to define a unique vibration frequency based upon the spring constant of the frequency member 26a–d. In particular, frequency member 26a vibrates at $F_a$, frequency member 26b vibrates at $F_b$; frequency member 26c vibrates at $F_c$ and frequency member 26d vibrates at $F_d$.

Piezoelectric transducer elements and associated contacts 34a–34d are coupled to each of the frequency members 26a–26d to measure the vibration of frequency members 26a–26d and produce a signal corresponding to the vibration of the frequency members 26a–26d. Piezoelectric elements 34a–34d are coupled to a PZT signal monitoring device 36. The piezoelectric signals produced from piezoelectric elements 34a–34d are analyzed by the PZT signal monitoring device 36 in a known manner to determine the frequency of the signal generated by piezoelectric elements 34a–34d in response to vibration of frequency members 26a–d. Since each frequency members 26a–26d vibrate at a unique frequency, the signals analyzed are used to isolate the particular frequency members 26a–d excited by contact with an asperity 30a and 30b.

In a preferred embodiment of the invention, the highest flying frequency member 26d is designed to have the lowest $F_d$ and the frequency members 26c–a below frequency member 26d have successively higher frequencies $F_{c-a}$ so that the lowest detected frequency corresponds to the highest frequency member contacted and thus corresponds to the height of the asperity. A height calculation processor 38 is coupled to the PZT signal monitoring device 36 to calculate the height range of an asperity based upon the frequency members excited. Although a piezoelectric detection element is described, the invention is not limited to a particular vibration detection device, and alternate embodiments of the invention may use other vibration detection devices.

Figure 3:
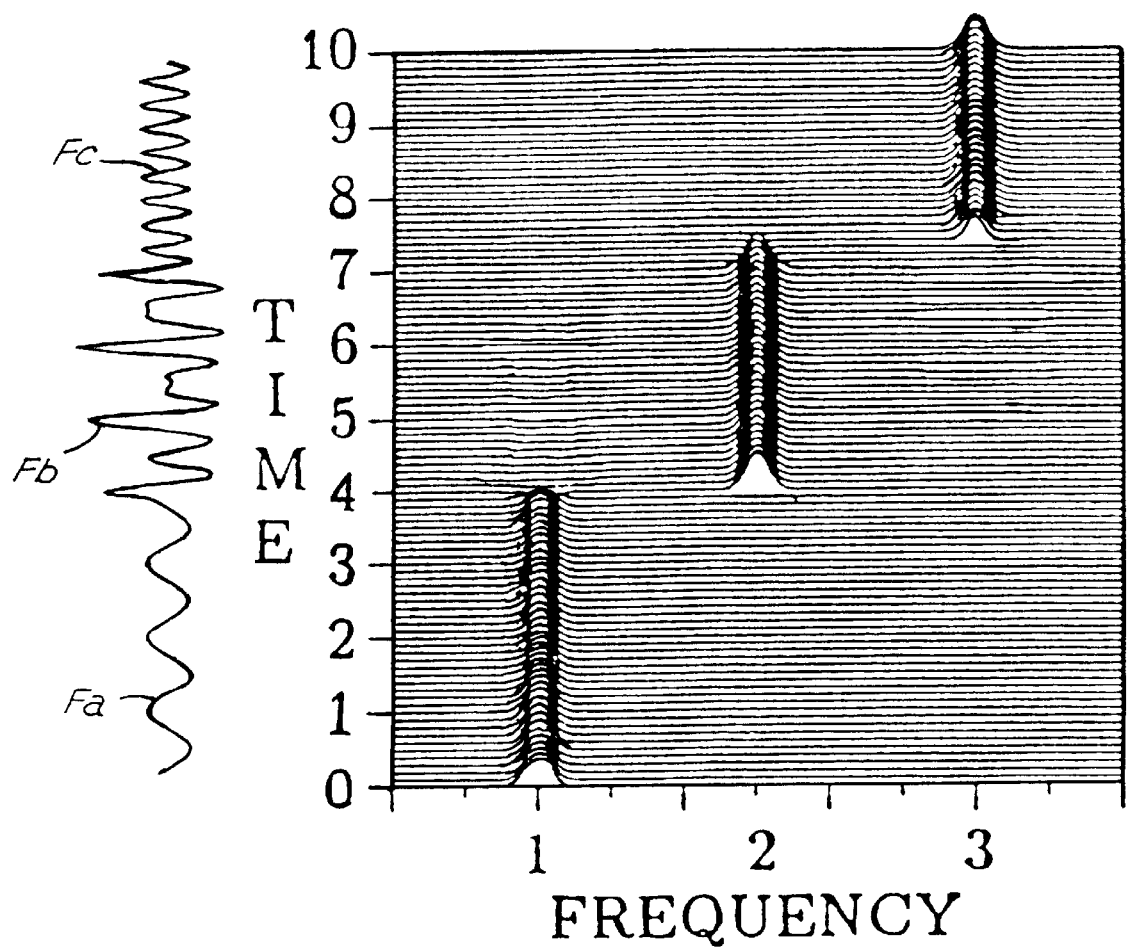
FIG. 3 is a diagrammatic view illustrating vibration of frequency members in response to contact with an asperity.
Figure 4:
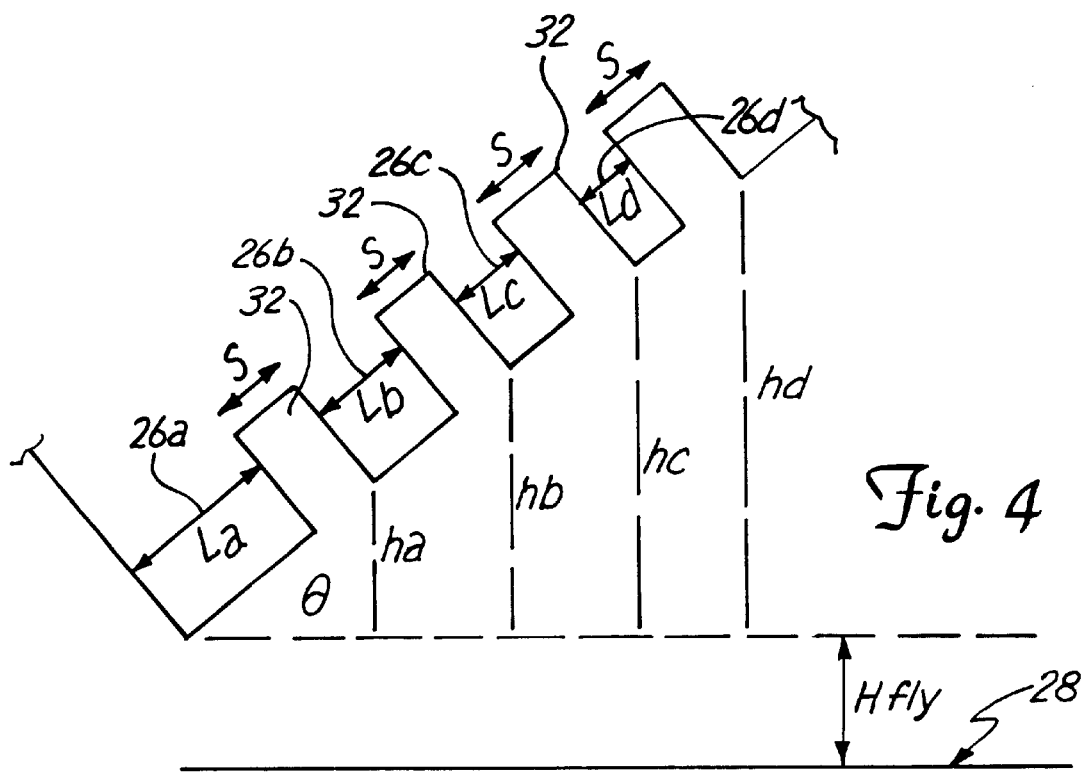
FIG. 4 is a diagrammatic view illustrating calculation of asperity height and characteristics based upon contact with frequency members.

FIG. 3 illustrates vibration for frequency members 26a–26c via contact with an asperity. As shown, frequency member 26a contacts an asperity first, followed by frequency member 26b and then frequency member 26c. As shown, each frequency member 26a–c produces a unique vibration frequency $F_a$–$F_c$ so that vibration of the various frequency members 26a–c may be distinguished. The height calculation processor 38 estimates the height of the asperity based upon the highest frequency member 26a–c vibrated. As shown in FIG. 4, the height of an asperity is based upon $H_{fly}$ plus the height of the highest frequency member contacted, i.e. $h_a$, or $h_b$ or $h_c$ or $h_d$. The following equations are used to estimate the Height of an asperity based upon the highest frequency member 26a–d contacted.

For frequency member 26a:

$$H_{fly} < \text{Height} < H_{fly} + (L_a + S) \times \text{SIN}(\theta_P) \quad \text{Equation 1}$$

For frequency member 26b:

$$H_{fly} + (L_a + S) \times \text{SIN}(\theta P) < \text{Height} < H_{fly} + ((L_a + S) + (L_b + S)) \times \text{SIN}(\theta_P) \quad \text{Equation 2}$$

For frequency member 26c:

$$H_{fly} + ((L_a + S) + (L_b + S)) \times \text{SIN}(\theta_P) < \text{Height} < H_{fly} + ((L_a + S) + (L_b + S) + (L_c + S)) \times \text{SIN}(\theta_P) \quad \text{Equation 3}$$

For frequency member 26d:

$$H_{fly} + ((L_a + S) + (L_b + S) + (L_c + S)) \times \text{SIN}(\theta_P) < \text{Height} < H_{fly} + ((L_a + S) + (L_b + S) + (L_c + S) + (L_d + S)) \times \text{SIN}(\theta_P) \quad \text{Equation 4}$$

Where, $L_a$, $L_b$, $L_c$, and $L_d$ relate to the length L of the frequency members; and S relates to the length of the recessed cavities 32 between frequency members 26a–d.

The pitch angle $\theta_P$ of sensor head 10 is determined based upon the speed of rotation of the disk, the characteristics of the air bearing surface 12, and a load force applied to an upper surface of the sensor head 10 via a load beam (not shown) in a known manner.

Thus, as shown in FIG. 2, frequency member 26a will contact asperity 30a, but none of the other frequency members 26b–d will contact asperity 30a. Thus, the height of asperity 30a is calculated based upon Equation 1. Asperity 30b extends to a higher elevation above the disc surface 28, than asperity 30a. Frequency members 26a–26c contact asperity 30b and thus, the height of asperity 30b is calculated based upon Equation 3.

The asperity height information may be downloaded to a data storage device, such as a RAM memory device in the control circuitry (not shown) in a known manner. The asperity information is stored, relative to disc location of the asperity to produce an asperity map. It should be noted that while only four frequency members 26a–d are shown, any number of frequency members 26 may be used for determining asperity height. Although a cantilevered type spring element has been described, the invention is not so limited, and alternative elements which produce a unique distinguishable signal when contacted may be employed to implement the present invention.

The sensor head 10 of the present invention also provides a burnishing surface for removing the asperity. Due to the abrupt features of the frequency members 26a–d and recessed cavities 32, the sensor head 10 of the present invention provides high contact stress between the frequency members and the asperity to burnish the asperity.

Figure 5:
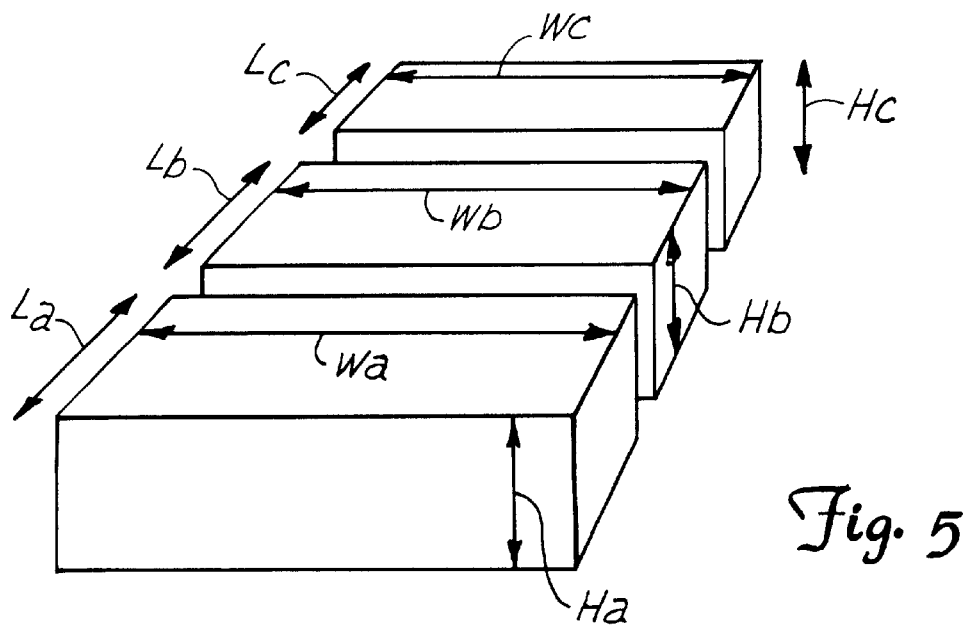
FIG. 5 is a detailed perspective view of the construction of frequency members on the sensor head.

FIG. 5 is a detailed perspective view of cantilevered polygon-shaped frequency members 26a–c (only frequency members 25a–c are shown) defined by dimensions L, W, and H. The dimension of individual frequency members 26a–d is varied to define unique vibration frequencies $F_a$, $F_b$, $F_c$, and $F_d$ (i.e. spring constant) for members 26a–26d. In the embodiment of the sensor head 10 illustrated in FIG. 5, dimensions L and W are varied and dimension H remains constant to define unique vibration frequencies for individual frequency members 26a–d. Preferably, dimension H is the same for all frequency members 26a–d so that the cantilevered ends 31 lie in the same plane to facilitate calculation of the height of the members 26a–d. Either dimension L or W, alone or in combination, may be varied to define the unique vibration frequencies for polygon members 26a–d.

The table below illustrates various excitation frequencies for frequency members 26a–26d, for a series of frequency members having constant W and H dimensions but a varied L dimension.

Example

| Frequency Member | Width ($\mu$m) | Height ($\mu$m) | Length ($\mu$m) | Minimum Frequency (kHz) |
|---|---|---|---|---|
| 26a | 200 | 20 | 9 | 189 |
| 26b | 200 | 20 | 7 | 146 |
| 26c | 200 | 20 | 5 | 105 |
| 26d | 200 | 20 | 3 | 63 |

Thus, the excitation frequencies detected by the PZT signal monitoring device 36 are compared with the known frequencies listed in the table above for frequency members 26a–26d to determine the frequency members 26a–26d excited for calculating the height of an asperity as previously explained. The distance between frequency members 26a–d is closely controlled in order to achieve a desired asperity height detection sensitivity or resolution for pitch angle $\theta_P$.

The number of spaced frequency members, and extent of the air bearing surface along which the frequency members extend, is defined to provide a sufficient range of members to detect asperities at various heights. The height of the asperity can be determined by the first frequency member contacted and thus asperity detection and analysis is not effected by shifts in flying parameters of the slider after contact with an asperity.

Although the present invention has been described with reference to preferred embodiments, workers skilled in the art will recognize that changes may be made in form and detail without departing from the spirit and scope of the invention.

What is claimed is:

1. A method for determining characteristics of an asperity on a surface of a disc comprising the steps of:

providing a head including a body having a leading edge, a trailing edge, and an air bearing surface, said air bearing surface including a plurality of spaced detection members, each of the plurality of detection members having a unique vibration frequency upon excitation to distinguish each of the plurality of detection members excited by contact with an object, each of the plurality of detection members being coupled to a detection device to detect vibration of each of the plurality of detection members;

flying the head above the surface of the disc at a pitch angle $\theta_P$ and a height $H_{fly}$ as the disc is rotated;

detecting excitation of each of the plurality of detection members excited by contact with an asperity based upon the unique vibration frequency of each of the plurality of detection members;

calculating a height of the asperity based upon a height of excited detection members above the disc surface.

2. The method of claim 1 wherein the plurality of detection members are cantilevered members which are separated by recessed cavities and the plurality of detection members extend from the trailing edge of the head along the air bearing surface and are arranged from a highest vibration frequency to a lowest vibration frequency and the step of detecting excitation detects the lowest vibration frequency and calculates the height of the asperity based upon the height above the disc surface of the detection member corresponding to the lowest vibration frequency detected.

3. The method of claim 1 wherein the height of the asperity is calculated based upon $H_{fly} \pm (L+S) \times SIN(\theta_P)$ for each of the plurality of detection members excited.

* * * * *

UNITED STATES PATENT AND TRADEMARK OFFICE
CERTIFICATE OF CORRECTION

PATENT NO. : 6,311,551 B1
DATED : November 6, 2001
INVENTOR(S) : Boutaghou

It is certified that error appears in the above-identified patent and that said Letters Patent is hereby corrected as shown below:

<u>Title page,</u>
Item [56], References Cited, U.S. PATENT DOCUMENTS,

| -- 4,757,402 | 7/1988  | Mo ............... 360/103         |
|--------------|---------|------------------------------------|
| 4,802,042    | 1/1989  | Strom ............ 360/103         |
| 4,870,529    | 9/1989  | White ............ 360/103         |
| 4,928,196    | 5/1990  | Hickok et al. ..... 360/105        |
| 5,073,836    | 12/1991 | Gill et al. ......... 360/113      |
| 5,550,692    | 8/1996  | Crane ............. 360/103        |
| 5,612,839    | 3/1997  | Jacques ........... 360/103        |
| 5,625,512    | 4/1997  | Smith ............. 360/103        |
| 5,673,156    | 9/1997  | Chen et al. ....... 360/97.01      |
| 5,742,518    | 4/1998  | Gui et al. ......... 364/508       |
| 5,825,181    | 10/1998 | Schaenzer et al. .. 324/212 --     |

Signed and Sealed this

Third Day of September, 2002

Attest:

Attesting Officer

JAMES E. ROGAN
*Director of the United States Patent and Trademark Office*